Patented June 5, 1928.

1,672,454

UNITED STATES PATENT OFFICE.

CARL ERNEST JULIUS GOEDECKE, OF MANCHESTER, ENGLAND, ASSIGNOR TO WILHELM EBERLEIN, OF MARPLE, ENGLAND.

PRODUCTION OF DYESTUFF EMULSION AND OF COLOR LAKE THEREFROM.

No Drawing. Application filed May 8, 1925, Serial No. 28,956, and in Great Britain August 16, 1924.

This invention has for its object to provide a new or improved simple and economical process for the production of colloidal emulsions or colloidal suspensions or colloidal solutions of dyestuffs.

The invention comprises the production of a colloidal emulsion, suspension or solution of dyestuffs from the dyestuff, a solvent for the dyestuff and a material which is either not a solvent for the dyestuff or which does not mix with the solvent for the dyestuff, but which when worked together with the dyestuff and solvent is capable of maintaining them in the form of an emulsion or a colloidal suspension, or a colloidal solution.

The invention further comprises the production of a colloidal emulsion, suspension or solution of dyestuff from a commercial dyestuff, a solvent for the dyestuff, insufficient in quantity to dissolve the whole of the dyestuff, and a material which is either not a solvent for the dyestuff or which does not mix with the solvent for the dyestuff, but which when worked together with the dyestuff and solvent is capable of maintaining them in the form of an emulsion or a colloidal suspension, or a colloidal solution.

The solvent for the dyestuff is usually water but other materials may be used, such as alcohols, acids, and alkalies according to the character of the dyestuff and the working it has to undergo. Mixtures of materials may also be employed. The proportions of the materials are not fixed or limited, but for normal services, the weight of the solvent may be equal to or up to twice the weight of the dyestuff. Most, if not all, of the dyestuffs of commercial quality are not soluble in such a small quantity of solvent, and in this process when using such dyestuffs, the quantity of solvent employed should be insufficient to form a real solution of the dyestuff at normal temperature. With my invention, however, I find it advantageous and economical to employ instead of the commercial dyestuff, the dyestuff in its most soluble form or a supersaturated solution of the dyestuff, examples being the chlorides or brilliant green and malachite green.

The third material serves to maintain the dyestuff and the solvent for the dyestuff or the dyestuff solution in the form of a colloidal suspension and must therefore be either non-solvent of the dyestuff or not miscible with the solvent for the dyestuff. For convenience of reference this third material is hereafter termed a protective agent. It must either be a colloidal body or a material which forms a colloidal suspension or colloidal solution during the process hereinafter described. The following are examples of materials which may be employed:— Oil, fat, mineral oil, waterglass, soap, dextrin, starch, glue, minerals in colloidal state and mixtures thereof. Minerals of crystalline structure are not suitable.

The three components, dyestuff, solvent and non-solvent material are worked up in a suitable machine until an emulsion or a colloidal suspension or a colloidal solution is produced. Generally, high speed colloid mills or emulsifiers are more efficient for the purpose than slow speed mills. If the emulsion of colloidal suspension is properly made, it will remain unchanged for a long period and whilst it may separate out if not properly produced, further working in the mill with or without the additional material will restore the emulsion or colloidal suspension. If the emulsion or colloidal suspension is used for making pigment colors or color lakes, then the fact that had such emulsion or colloidal suspension been allowed to, it would have separated out, will have no effect on the properties of the pigment colour once it is produced.

The emulsion or colloidal suspension or colloidal solution of the dyestuff may be used for dyeing, calico printing or lake making. Pastes can be produced by my process of high concentration and without the employment of heat even for dyestuffs of very little solubility.

If the emulsions or colloidal suspensions or colloidal solutions be utilized in combination with suitable substrata, such as green earth, white earth, and the like for the production of pigment colors, then it will be found that after working the emulsion and the substratum in the usual way, the pigment color is practically or perfectly dry. The colors have a much greater yielding or staining capacity and give very pure shades.

*Examples.*

(1) 1 lb. of Auramin (Schultz-Julius No. 493) is emulsified in a colloid mill with 1 lb. of water and 2 lbs. of mineral oil and this emulsion is carefully ground in an edge-runner with 112 lbs. of green earth. A yellow body color is produced which needs no drying. In place of Auramin, any other basic dyestuff and in place of green earth any other fixing earth, may be used.

(2) 1 lb. of Sulphur Green (Katigen Green Schultz-Julius No. 746) is emulsified in a colloid mill with 1 lb. of 20% caustic soda solution and 1 lb. of soluble castor oil and 1 lb. of castor oil. The emulsion or colloidal suspension forms a paste for dyeing, calico printing, lake-making etc. For making a pigment color, the emulsion is worked intimately with 50 lbs. of barytes in an edge-runner. A quantity of concentrated solution of aluminium sulphate is added until the mass in the edge-runner has a neutral reaction.

(3) 5 lbs. Ponceau R (Schultz-Julius No. 82) is emulsified with 3 lbs. of water, 2 lbs. soluble castor oil and 4 ozs. dextrin. This emulsion is suitable for dyeing, printing and lakemaking. In place of Ponceau any other acid color may be used. For making body colors, 112 lbs. barytes is ground with 5 lbs. barium chloride and the Ponceau emulsion intimately worked with the latter in the edge runner. The body color is practically dry and is very serviceable as a distemper color.

(4) 1 lb. Brilliant Green (Schultz-Julius No. 499) base is transformed into the chloride with the requisite exact amount of hydrochloric acid and brought up to 2 lbs. with water. To this 2 lbs. mineral oil is added. The mixture is emulsified in a colloid mill.

I claim:—

1. A method for the production of a colloidal dispersion of a dyestuff which comprises colloidally dispersing said dyestuff in a quantity of solvent therefor insufficient to dissolve the whole of said dyestuff and in the presence of a substance adapted to act as a protective agent for said dispersion.

2. As an article of manufacture, a colloidal dispersion of a dyestuff, comprising a dyestuff, a solvent for said dyestuff insufficient in quantity to dissolve said dyestuff, and a protective agent for said dispersion.

In testimony whereof I have signed my name to this specification.

CARL ERNEST JULIUS GOEDECKE.